US009864944B2

(12) United States Patent
Radu et al.

(10) Patent No.: US 9,864,944 B2
(45) Date of Patent: Jan. 9, 2018

(54) DISPLAY CARD WITH USER INTERFACE

(71) Applicant: MasterCard International Incorporated, Purchase, NY (US)

(72) Inventors: Cristian Radu, Beauvechain (BE); Sebastien Pochic, Brussels (BE); Fikret Ates, Namur (BE)

(73) Assignee: MasterCard International Incorporated, Purchase, NY (US)

( * ) Notice: Subject to any disclaimer, the term of this patent is extended or adjusted under 35 U.S.C. 154(b) by 34 days.

(21) Appl. No.: 14/305,423

(22) Filed: Jun. 16, 2014

(65) Prior Publication Data

US 2014/0367474 A1 Dec. 18, 2014

(30) Foreign Application Priority Data

Jun. 17, 2013 (GB) .................................. 1310774.3

(51) Int. Cl.
*G06K 19/06* (2006.01)
*G06K 19/077* (2006.01)
*G06Q 20/34* (2012.01)
*G07F 7/08* (2006.01)
*G06K 19/073* (2006.01)

(52) U.S. Cl.
CPC ...... *G06K 19/07701* (2013.01); *G06K 19/073* (2013.01); *G06K 19/07705* (2013.01); *G06K 19/07707* (2013.01); *G06K 19/07709* (2013.01); *G06Q 20/3574* (2013.01); *G07F 7/0806* (2013.01)

(58) Field of Classification Search
CPC ....... G06K 19/07749; G06K 19/07754; G06K 19/07766; G06Q 20/341

USPC .................................................. 235/492, 487
See application file for complete search history.

(56) References Cited

U.S. PATENT DOCUMENTS

| 5,955,961 | A | 9/1999 | Wallerstein | |
| 6,233,683 | B1 * | 5/2001 | Chan et al. | ................... 713/172 |
| 7,602,740 | B2 * | 10/2009 | Master | .................. G06Q 30/02 370/282 |

(Continued)

FOREIGN PATENT DOCUMENTS

DE         4012931 A1    10/1991

OTHER PUBLICATIONS

Intellectual Property Office, "Patents Act 1977: Search Report under Section 17(5)", dated Dec. 9, 2013, for GB Application No. 1310774.3, 4pgs.

*Primary Examiner* — Daniel St Cyr
(74) *Attorney, Agent, or Firm* — Buckley, Maschoff & Talwalkar LLC (57) ABSTRACT

A display card 301 with a user interface for providing one or more services. The card 301 comprises: an external interface 302, 303 for communication with a terminal external from the card 301; a Chip 401 comprising one or more servers for storing one or more applications, wherein the Chip 401 is arranged to communicate with the external interface 302, 303; a user interface 304, 305, 306 for interacting with a user of the card 301; a micro-terminal 402 for controlling the provision of one or more services, wherein the micro-terminal 402 is arranged to communicate with the user interface 304, 305, 306; and the Chip 401 and micro-terminal 402 are arranged to communicate with each other via an internal interface 403 of the Chip 401. Applications include payment cards and passes.

16 Claims, 6 Drawing Sheets

(56) References Cited

U.S. PATENT DOCUMENTS

| | | | |
|---|---|---|---|
| 7,717,348 B2* | 5/2010 | Kawamura | G06K 19/0719 235/487 |
| 8,296,561 B2* | 10/2012 | Kanemura | G06F 21/10 713/155 |
| 8,788,420 B1* | 7/2014 | Green | G06Q 20/4016 705/44 |
| 8,960,540 B2* | 2/2015 | Smets et al. | 235/380 |
| 2005/0033983 A1* | 2/2005 | Takekawa | G06F 21/31 726/2 |
| 2010/0311466 A1* | 12/2010 | Wilson | G06Q 20/341 455/557 |
| 2012/0298747 A1* | 11/2012 | Mestr | G06Q 20/354 235/380 |
| 2013/0048712 A1 | 2/2013 | Guillaud et al. | |
| 2013/0080274 A1* | 3/2013 | Pochic | G06Q 20/409 705/16 |

* cited by examiner

FIG. 1

(Prior Art)

FIG. 2

(Prior Art)

FIG. 3

(Prior Art)

DISPLAY CARD WITH USER INTERFACE

CROSS-REFERENCE TO RELATED APPLICATION

This application is a U.S. National Stage filing under 35 U.S.C. §119, based on and claiming benefit of and priority to GB Patent Application No. 1310774.3 filed Jun. 17, 2013, the entire contents of which are hereby incorporated in their entirety for all purposes.

FIELD OF THE INVENTION

The field of the present invention is chip cards with user interfaces. The user interfaces may include one or more of a display, a keyboard, signalling LEDs, and biometric sensors. In particular, embodiments provide a new display card with keyboard (DCK) architecture that has improved functionality over known DCK architectures.

BACKGROUND OF THE INVENTION

The use of passive cards, comprising a magnetic strip and/or chip for storing information, for applications such as payment devices (i.e. chip and PIN) and travel passes, is well known. Advantages of using such cards include the cards being cheap and easy to manufacture. In addition, their small size and low weight makes them highly portable.

Developments in mobile telephone technology have allowed these also to be used as payment devices, passes and other applications. The communication and processing capability of mobile telephones provides many advantages over passive cards, in particular an increased service availability for the cardholder.

However, a problem with using mobile telephones for applications such as payment devices is that it is difficult to provide a secure device. Mobile telephones are required to support a diverse range of applications and it cannot be ensured that these are all from trusted sources. It is therefore necessary for complicated techniques to be applied in order to protect the information on the mobile telephone from any malware that may also be present. In addition, the relatively large cost of a mobile telephone means that if it is lost, as sometimes happens with items in common usage, then it is expensive to replace.

Figure 1:
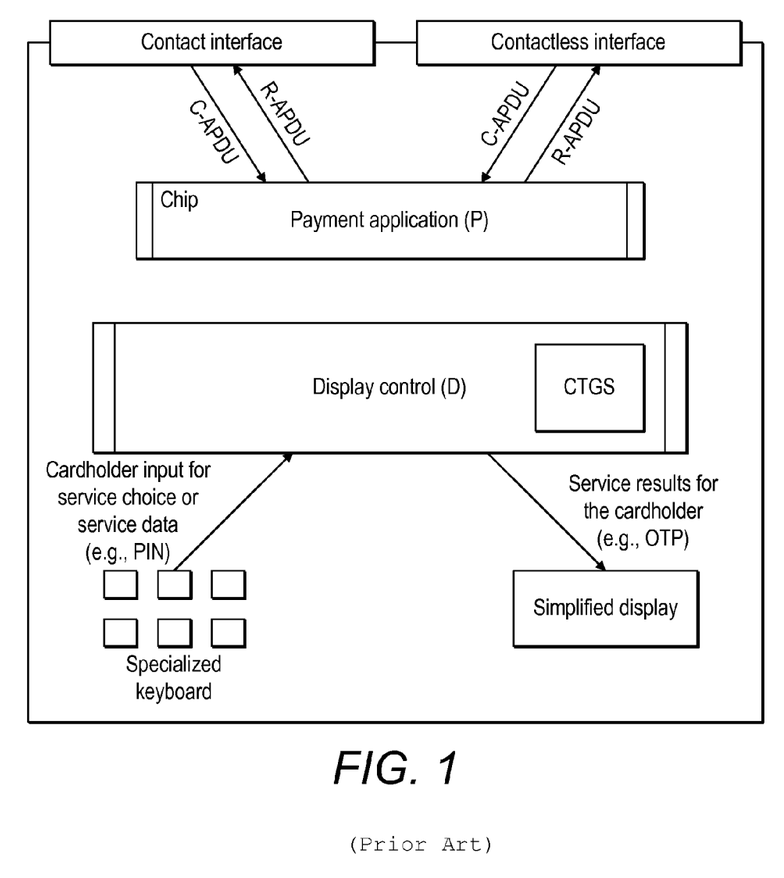
FIG. 1 shows a known architecture of a DCK.
Figure 2:
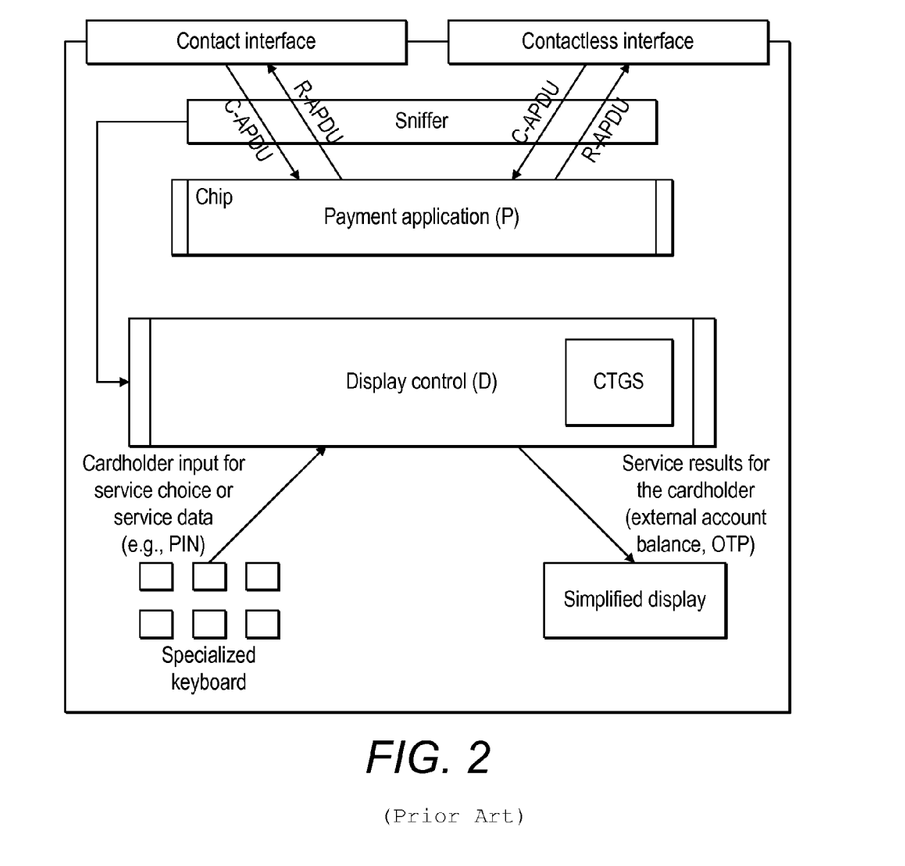
FIG. 2 shows a known architecture of a DCK that comprises a Sniffer.

An improvement over the above-described passive cards is a display card with keyboard (DCK). FIGS. 1 and 2 show known architectures of DCKs, FIG. 3 shows the architecture of a known DCK at the level of its user interfaces.

Figure 3:
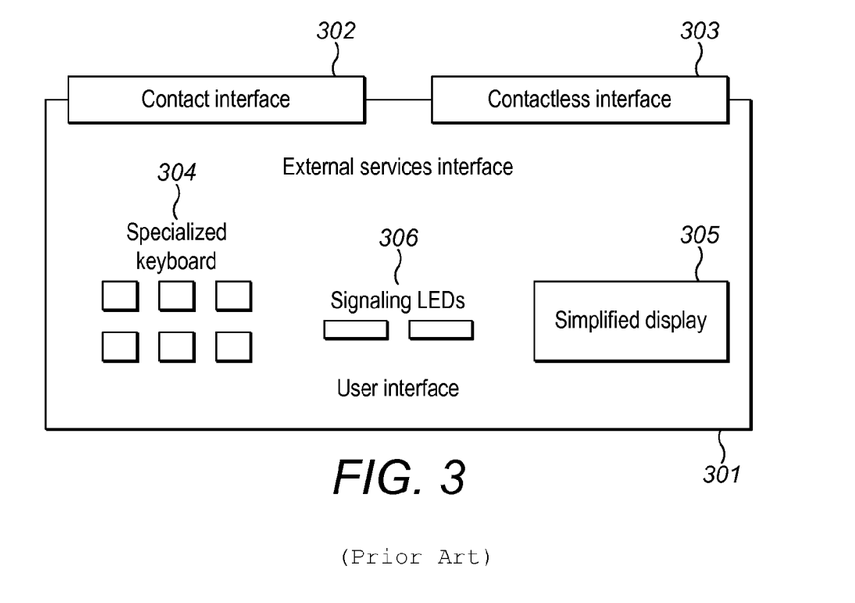
FIG. 3 shows a known architecture of a DCK, at the level of its user interfaces.

As shown in FIG. 3, a known DCK may comprise contact and contactless interfaces, a specialised keyboard, simplified display and signalling LEDs. The user interface provided by the keyboard and simplified display allow improved security and functionality. For example, the card may generate a one time password, OTP, that may be autonomously displayed by the DCK and used to log onto an internet banking account.

Advantages of a DCK over a mobile telephone include the DCK being inherently more secure since it is a lot harder for a malicious party to gain access to any information stored by the DCK. A DCK is also not required to run the diverse range of applications that mobile telephones are and so they do not experience malware problems due to software from untrusted sources. Moreover, DCKs are easily used for both contact and contactless information transfer with a terminal whereas mobile telephones are only usable for contactless information transfer. In addition, the relatively low cost of DCKs means that they are cheap and easy to replace if lost.

The architectures of known DCKs are described below with reference to FIGS. 1 and 2.

FIG. 1 shows a first known architecture of a DCK that is used as a payment device. There are two separate processors, shown as Chip and Display Control. The card also has interfaces for contact and contactless communication as well as a specialised keyboard and a simplified display.

The Chip accommodates a typical payment application (P), and possibly other applications as may be required for ticketing, loyalty, etc. The only way of accessing applications in the Chip is through the external services interface, either through contact or contactless communication with the DCK.

The Display Control (D) is connected to the specialized keyboard and to the simplified display. There is no communication path on the DCK between the Chip and the Display Control and accordingly these modules are not able communicate with each other. In addition, the Display Control has no connection to the contact and contactless interfaces, which can only be used to access the Chip.

In the architecture shown in FIG. 1, the Display Control implements a Cardholder Authentication Program (CAP) Token Generation Service (CTGS), with a separate cryptographic key for Application Cryptogram (AC) computation and OTP generation. This requires the Display Control to be implemented as a tamper resistant/tamper detective-responsive component and therefore increases costs.

Another problem with the architecture of the DCK shown in FIG. 1 is that the Display Control can only provide services that do not require access to the applications in the Chip. It therefore cannot provide services such as the reading of an accumulator/counter of the balance of a payment application, or the reading of a trace record in a log file.

FIG. 2 shows another architecture of a known DCK. The architecture in FIG. 1 has been modified to comprise a Sniffer in communication with the Display Control so that further services can be provided. The Sniffer is able to read the communication between the Chip and the contact and contactless interfaces. From this information, the Display Control is able to deduce, for example, an external account balance.

However, a problem with the architecture of FIG. 2 is that the additional services provided are limited to what can be achieved by reading the communication between the contact and contactless interfaces and the Chip. In practice, all that can be determined form this communication are updates of accumulators/counters, their limits and balances. It is not possible for the Display Control to directly access any of the information in the Chip.

Moreover, the architectures of the DCKs in FIGS. 1 and 2 are not scalable. Their electronic circuitry is designed for specific functions; to provide a new function, such as to temporarily disable information transfer over the contactless interface, would require a change in the electrical and physical configuration of the DCKs.

The DCKs in FIGS. 1 and 2 both comprise batteries. The battery in each DCK is used to power only the Display Card and not the Chip. The Chip is powered by the point of interaction, POI, terminal, either through the Chip's contacts or by electromagnetic induction through an antenna. A further problem with known DCKs is that their operation is restricted by the technique of powering the Chip.

SUMMARY OF THE INVENTION

According to a first aspect of the invention, there is provided card for providing one or more services, the card comprising: an external interface for communication with a terminal external from the card; a Chip comprising one or more servers for storing one or more applications, wherein the Chip is arranged to communicate with the external interface; a user interface for interacting with a user of the card; a micro-terminal for controlling the provision of one or more services, wherein the micro-terminal is arranged to communicate with the user interface; and the Chip and micro-terminal are arranged to communicate with each other via an internal interface of the Chip.

Advantageously, the communication between the chip and the micro-terminal allows greatly improved functionality over known cards since the micro-terminal is able to obtain information from within the Chip.

Preferably, the external interface comprises: a contact interface for communication with the external terminal over a non-wireless connection; and/or a contactless interface for wireless communication with the external terminal.

Preferably, the user interface comprises one or more of: a keyboard; a display; and LEDs.

Preferably the Chip is configured to send information to the micro-terminal via the internal interface in response to receiving one or more commands from the micro-terminal.

Preferably, the Chip is configured to send information to the external terminal via the external interface in response to receiving one or more commands from the external terminal.

Preferably, the one or more commands are Command Application Protocol Data Units, C-APDUs, and the information sent in response to receiving the one or more commands are Response Application Protocol Data Units, R-APDUs as per ISO 7814-4.

Preferably, the card further comprises a battery arranged to provide the power supply of both the Chip and the micro-terminal.

Preferably, the micro-terminal is a reconfigurable processor.

Preferably, the Chip comprises a plurality of servers.

Preferably, the Chip comprises an interception application for controlling the operation of the servers of the Chip when providing the services of the micro-terminal.

Preferably, the interception application is arranged between the external interface, the internal interface and the servers of the Chip.

Preferably, the interception application comprises an engine arranged to control logical switching and filtering operations.

Preferably, the Chip has permanent electrical connections to the components of the external interface; and the interception application is configured to logically switch on and off communication between the Chip and the components of the external interface without physically changing the electrical connections to the components of the external interface.

Preferably, the micro-terminal is arranged to send one or more commands to the Chip and to use the information received in one or more responses to provide one or more of the following services: display an account balance of the card; display a log of operations performed by the card; display a one time use password generated by the card; and verify, by the card, a PIN of a user that is input to the user interface of the card.

Preferably, the micro-terminal is arranged to provide a new service by performing logical operations only and without changing the electrical configuration of the card.

Preferably, the new service comprises disabling any of the components of the external or user interfaces of the card, such as disabling contactless communication with the card.

Preferably, a service is provided in response to the user interface of the card receiving a selection of the service from a user.

BRIEF DESCRIPTION OF THE DRAWINGS

Embodiments of the invention will now be described, by way of example only, with reference to the accompanying drawings, in which.

DETAILED DESCRIPTION

Embodiments of the invention improve the functionality of a DCK through the use of a new architecture. The new architecture allows an increased range of services to be provided by the DCK.

In a particularly preferred embodiment, a DCK is used as a payment card. Services provided by DCKs used as payment cards according to embodiments include one or more of:

On-device Cardholder Verification Method, CVM—this service allows the keyboard of the card to be used to input an on device CVM, i.e. m-PIN (similar to that verified by a mobile phone), before being presented to a POI terminal.

On-card account selection—this service allows the preselection of an application, such as an EMV application, from several, which gives a Cardholder the ability to select between a debit or a credit payment product, or to use "loyalty points" as private currency to pay at the POI terminal, etc.

On-card activation of the contactless payment functionality—this service allows the Cardholder to activate the contactless payment functionality of the dual interface card only when the Cardholder desires it. This avoids the unauthorized use of a card without the Cardholder's explicit acknowledgement. Such contactless payments may be made using MasterCard's® PayPass™.

The improved services provided by the DCKs according to the embodiments described herein are possible due to the design of the DCK being based on a logical and programmable architecture rather than the electronic architecture of known DCKs. That is to say, the functionality of DCKs according to embodiments is reconfigurable without modifying DCK's hardware. For a DCK to provide a new service, it is therefore only necessary to provide the DCK with a program for implementing the new service. This differs from known DCKs that are not reconfigurable and require modifications of their electrical circuitry in order to provide a new service.

Figure 4:
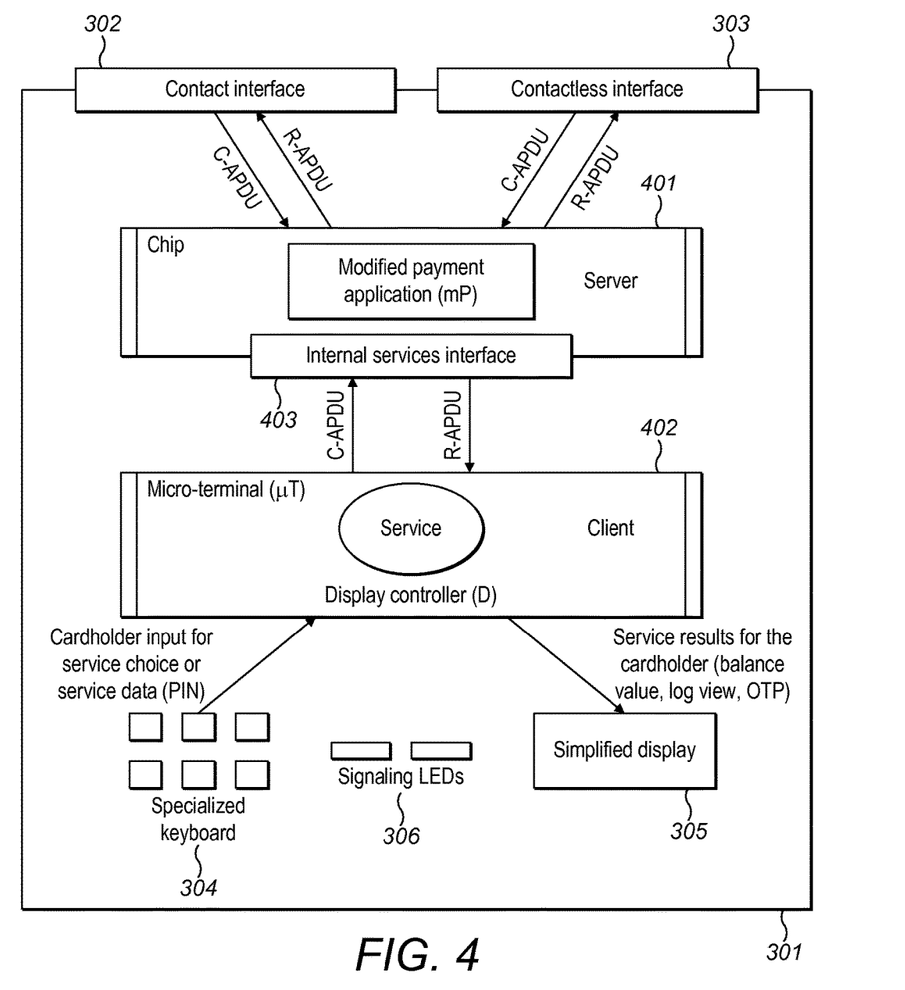
FIG. 4 shows an architecture of a DCK according to an embodiment of the present invention.

FIG. 4 shows the architecture of a DCK 301 according to an embodiment. The user interfaces of the DCK 301 are shown in FIG. 3.

The DCK 301 comprises a micro-terminal 402, μT, that comprises a Display Controller. The DCK 301 has contact and contactless interfaces 302, 303 through which communication with the Chip 401 is possible with Command Application Protocol Data Unit (C-APDU) and Response Application Protocol Data Unit (R-APDU) messages. The DCK 301 also has a specialised keyboard 304, simplified display 305 and signalling LEDs 306 that provide a user interface in communication with the Display Controller. There is an internal services interface 403 that allows direct communication between the Chip 401 and the micro-terminal 402 through ISO 7816 commands, i.e. C-APDU and R-APDU.

The provision of an internal interface 403 between the Chip 401 and the micro-terminal 402 greatly increases the services that can be provided by the DCK 301.

When the known architectures of DCKs were designed, the practical constraints of Chip and battery technology resulted in it only being possible to supply power to the Display Control and the Chip was not powered by the DCK's battery.

However, the inventors have determined that it is possible to provide a DCK 301 with the battery of the DCK 301 powering both a Chip 401 and a micro-terminal 402 comprising a Display Controller. Accordingly it is not necessary for the Chip 401 to be powered by a POI terminal.

A more detailed description of embodiments is provided below. Although the embodiments are described with DCKs being used as payment devices, this is purely exemplary and the DCKs according to embodiments are usable in a wide range of applications including passes, such as travel passes.

FIG. 3 is a view of a DCK 301 at the level of the card interfaces. Although the components of the card interfaces are present on known DCKs, embodiments improve the functionality of the card interfaces.

The DCK 301 has two categories of interface. These are:

External services interface 302, 303. This is a known interface offered by DCKs currently in use as payment cards. The interface processes payment services such as credit, debit and pre-paid. The interface may also process other services than payment, such as loyalty, transit, etc.

User interface. This allows improved functionality from that provided by known payment cards.

The external services interface 302, 303 comprises:

Contact interface 302. This may operate according to ISO 7816.

Contactless interface 303. This may operate using NFC communication. The interface supports a contactless communication protocol, such as the EMV contactless communication protocol.

The DCK 301 is a dual interface card since both contact and contactless communication are provided by the external interface.

The user interface comprises:

Specialized keyboard 304. In embodiments, this allows the Cardholder to key in a service choice, a PIN for authentication, etc.

Simplified display 305. In embodiments, this allows a Cardholder to retrieve service information concerning the status of a payment product such as, for example, the balance of a bank account, or the balance of an on-card account, or a one-time password that can be used for authentication in remote card not-present transactions.

Signalling LEDs 306. In embodiments, these may inform the user of an on/off functionality, such as contactless functionality active/inactive, debit or credit product selected, etc.

FIG. 4 provides a high level view of a DCK 301 comprising a client/server architecture according to embodiments. The client/server communication is possible due to the new internal interface 403 that acts as a bridge between the Chip 401 and micro-terminal 402 provided by embodiments. The architecture consists of two functional modules:

Server—This application runs in the Chip 401 and consists of a modified payment application, mP.

Client—This application is a service running in the micro-terminal (μT) 402. The micro-terminal 402 also hosts the Display Controller, D, that interfaces with the keyboard 304, the simplified display 305 and the signalling LEDs 306.

The Client and Server modules interact as follows:

The Client sends a command C-APDU to the Server, according to the logic implemented by the service.

The Server interprets the command, performs the appropriate processing required corresponding to the command, and responds with an R-APDU to the Client. The Client uses the content provided by the Server to execute the logic of the service.

The Chip 401 runs the modified payment application. This is a dual interface application, such as MasterCard's® PayPass™ M/Chip 4 or M/Chip Advance, that is modified with:

A supplementary internal services interface. This is logically different from the external services interface, but may be physically implemented on the contact interface.

A switching mechanism between various Application Modes. This distinguishes whether the incoming commands are coming from the external services interface 302, 303 or from the internal services interface 403 and adapts the processing of the application accordingly.

The modified payment application interfaces to:

(externally) a POI terminal, via contact and/or contactless communication.

(internally) a Micro-terminal 402, through the internal services interface 403. This allows C-APDU/R-APDU exchange with a service selected through the user interface.

A service in the micro-terminal 402 implements a sequence of commands, C-APDU, that are sent by the Client to the Server and the processing of each response, R-APDU, returning from the Server.

The micro-terminal 402 interfaces to:

(internally) The modified payment application through the internal services interface 403.

(internally) Keyboard 304 from where it captures Cardholder input and service data. The Cardholder input provides service choice, e.g., balance display, log display, OTP generation, on-device PIN capturing. The service data, is, for example, a PIN for enabling the OTP service or for on-device CVM.

(internally) Display 305. This is used to provide service results, like the value of the balance, the last record of the log, the OTP code, etc.

(internally) Signalling LEDs 306 to inform the user about an on/off status of a service, e.g., antenna not active, "debit but not credit".

The implementation of services by the Client is generic. That is to say, the microelectronics in the DCK 301 is reconfigurable and not specific to each service. The applications, once adapted for use in various Application Modes on the internal services interface 403, are reusable and portable from one micro-terminal 402 to another. Therefore the architecture according to embodiments is capable of providing a broad range of services.

Advantageously, the above-described DCK 301 architecture according to an embodiment provides an increased range of services than possible with known architectures of DCKs. In particular, the information transfer between the Chip 401 and micro-terminal 402 over the internal direct communication link between them greatly improves the functionality of the DCK 301.

In addition, a DCK according to embodiments is self-contained and able to function as, for example, a secure payment device. The DCKs operate in a closed environment and this greatly improves the security over devices such as mobile telephones.

Figure 5:
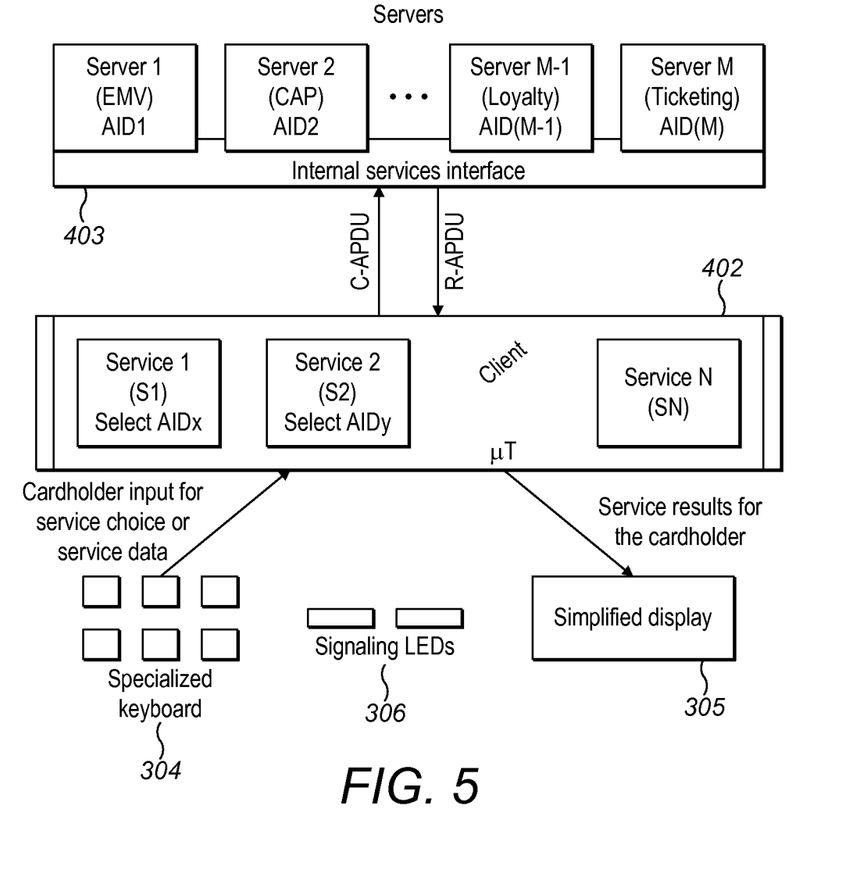
FIG. 5 shows part of the architecture of a DCK comprising a plurality of servers according to an embodiment of the present invention.

In the above-described embodiment, a DCK 301 comprises a payment server. A further embodiment of a DCK 301 architecture is shown in FIG. 5 in which there are a plurality of servers provided in the Chip 401 of the DCK 301.

In the shown embodiment, the OTP/CAP application is segregated from the payment application, as is preferable for ensuring security.

A service may call on different servers, in a sequential order, by specifying each time the application identifier, AID, of the required server.

The list below gives examples of services that may be delivered to the Cardholder using the client/server architecture:

Balance Display. This allows a user to visualize a specific on-card account balance.

Log Display. This allows a user to visualize a record of the log in modified payment application.

Cardholder Authentication Program (CAP) Service. Production and visualization of OTPs for remote card-not-present payment transactions.

On-device Cardholder Verification Method (CVM), i.e. m-PIN, for contactless high value transactions and for fraud reduction at ATMs.

These services are described in more detail below.

The on-card account balance display service allows the reading of an on-card account balance and its display on the DCK 301. The on-card account is kept in one of the Card Risk Management, CRM, resources of the payment application in a server, for example, in accumulators and/or counters. The micro-terminal 402 retrieves information from the Chip 401 in order to display the balance.

The log display service allows the reading of a record in the internal log of the modified payment application and its display on the DCK 301.

This service improves the user experience since the user can check transactions performed in a time interval. In addition, the service can also be used as a witness in performing a certain payment transaction by a third party, like checking the payment of a metro ticket fee by a transport network controller. The CAP Service refers to the use of CAP or PIN-less personalization-less authentication (PLA) technology to generate an OTP.

The service is also implemented in known DCK 301 architectures. It advantageously allows the issuing bank to address all interaction channels from the card, without having to distribute Personal Card Readers for the CAP token production.

When integrated as a service in the micro-terminal 402 of embodiments and relying on an application in the Chip 401, the technical requirements and cost of the overall implementation decreases since there is no need for a second tamper resistant processor in the DCK 301.

The on-device CVM refers to the typing of the PIN directly into the card. The on-device CVM is often referred to as m-PIN. The on-device CVM improves security, because typing a PIN into a DCK 301 is inherently more secure than typing a PIN into a terminal.

In known DCKs, the POI terminal serves to capture the CVM. When the CVM is an offline PIN, the price of the POI terminal increases due to the high costs of implementing a secure keyboard.

When implementing online PIN at an ATM or POS, not only must a keyboard be implemented as a costly PIN encryption device, but it also must be loaded with encryption keys, which is a high operational burden for acquirers. In addition, malicious parties are known to target the PIN at the POI terminal with over-the-shoulder spying using video-cameras. Furthermore, the operation of high value contactless transactions using manual signature, currently only possible at attended POI terminals, and online PIN prevents the Tap&Go user experience which is a deterring factor in the adoption of contactless transactions.

The implementation of CVM, or m-PIN, by the DCKs according to embodiments solves the above-identified problems since the user inputs a PIN directly into the DCK 301. DCKs according to embodiments therefore allow the following advantages:

Provide the same Tap&Go user experience in contactless operation, for high value transactions.

Reduce ATM fraud.

Decrease the price of POI terminals.

Accordingly, the provision of a DCK 301 with a Chip 401 comprising plurality of servers that provide information to the micro-terminal 402 in order to implement one or more services improves the functionality of the DCK 301. The multiple servers are particularly preferable for implementing multi-modal applications as may be used for services that change the state of a payment application from one transaction to another. This may occur when the Cardholder types in a PIN as a separate interaction with a DCK 301 preceding a payment transaction at a POI terminal.

Figure 6:
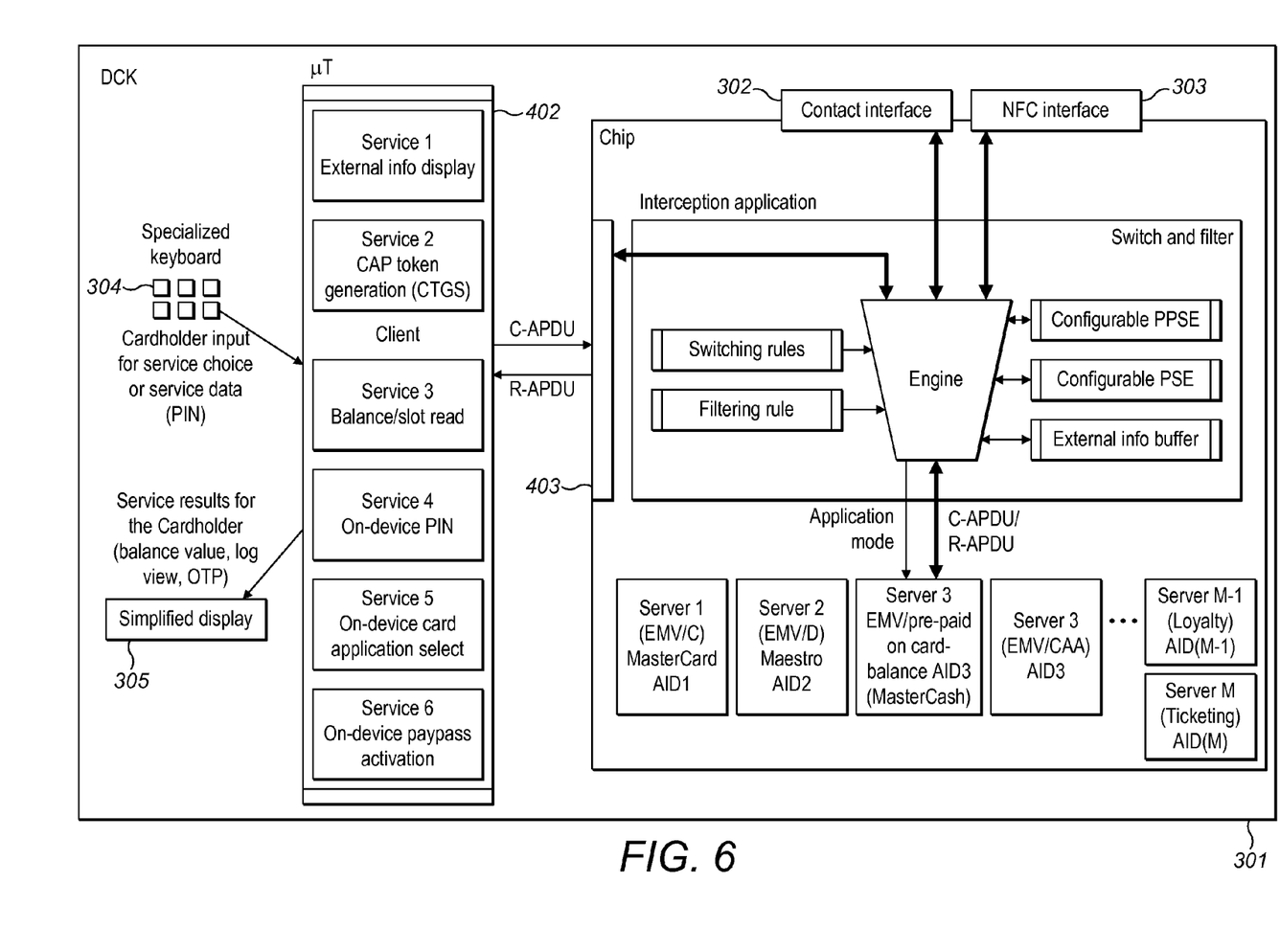
FIG. 6 shows the architecture of a DCK that comprises an interception application according to an embodiment of the present invention.

FIG. 6 shows a high level architecture according to a further embodiment. Advantageously, the architecture is able to provide a large range of services, including:

On-card application selection—This service consists of using the DCK 301 for a pre-selection of the application which the Cardholder wants to use in the following payment transaction, independent of the selection mechanism of the POI terminal. For example, the Cardholder is able to choose between the debit and credit products of a combo card, or to choose to pay with loyalty points at a POI terminal that supports private currency, using only the DCK's keyboard 304 and being reminded of his selection with the appropriate signalling LEDs 306 or from the display 305. This also allows the DCK 301 to be used flexibly with different versions of POI terminal that may only be able to provide specific services.

On-card contactless payment activation—This service consists of an explicit acknowledgement of the contactless payments by the Cardholder. This is a useful feature for countering unsolicited transactions triggered by hackers equipped with bogus contactless payment readers passing nearby a Cardholder's wallet.

As shown in FIG. 6, the architecture has been adapted to include an interception application that allows the provision of at least the above-identified services as well as other complex services.

The interception application is a multiple interface application that bridges between the contact and contactless external services interfaces, the micro-terminal, via the internal services interface 403, as well as the applications in the servers of the Chip 401.

The interception application is a logical switch and not a physical one. The interception application therefore provides services through software operations and not by changing the electrical circuitry of the DCK 301. For example, the antenna for contactless communication with the DCK 301 would be permanently electrically connected to an engine of the interception application. If it was desirable to, temporarily or permanently, disable the contactless operation of the DCK 301, the communication to and from the antenna would be stopped using software within the interception application only and the electrical connection to the antenna would be unchanged.

The interception application allows the DCK 301 to operate more independently of the external environment. For example, in FIG. 6, the Configurable Payment System Environments (PSE) and PayPass™ (i.e. contactless) Payment System Environment (PPSE) bridge the services the DCK 301 offers and what the user wants. They can be changed, by either the Cardholder or from instructions from a POI terminal, and influence which applications are run.

The supported server types include:
Applications such as M/Chip. For example, operator service data stored in the data storage memory pad of an M/Chip Advance application may be displayed to show how many vouchers are left, how many loyalty points are still available in the on-card balance, etc.
Applications from any providers. For example, a ticketing application provided by a transport operator for contactless interface operation, such as Mifare™.

The core of the interception application consists of an engine that performs switching and filtering, as shown in FIG. 6.

The engine fulfils the following functions:
Command/response (C-APDU/R-APDU) flow switching;
Application Mode selection for multi-modal applications;
Selection commands filtering;
External flow sniffing and capturing; and
Providing a cryptographic server for verifying authenticity and decrypting content received from a host for displaying on the DCK 301.

Switching rules represent the parameterization required for the engine's function of command/response (C-APDU/R-APDU) flow switching. Examples of some of the rules and corresponding policies that can be implemented are provided below with reference to the services and severs shown in FIG. 6:
Rule 1: Unconditionally allow contactless transactions with the transit application
Policy 1: This switch is established from the contactless interface, e.g. NFC interface, which may generically include the communication stack, to the Server M—Ticketing. Working with mutual Card/Terminal authentication, as Mifare™ does, ensures that the ticketing application cannot be illegitimately triggered by a fake terminal.
Rule 2: Explicit permission for contactless transactions with Maestro®

Policy 2: This switch is explicitly established by Service 6 in the micro-terminal 402 which changes a switching rule from the state "do not allow" to "allow" for the flow between the "NFC interface", which may generically include the PayPass™ communication stack, to the Server 2—Maestro®. This is in order to favour security vs. usability since the Maestro® application can illegitimately be triggered on the contactless interface by a fake terminal as terminal authentication is not available.
Rule 3: Unconditionally allow Service 2 on the internal services interface 403 (contact) to use the Server 3 EMV/CAA (Chip Authentication Application).
Do not allow Server 3 EMV/CAA execution from the external services interface 302, 303.
Policy 3: This switch is always established to allow the production of a CAP token only by the Cardholder, when using the keyboard 304 of the DCK 301 and not while the card is in communication with a POI Terminal.
Rule 4: Allow Service 1 read the External Info Buffer in the interception application.
Rule 5: Allow Service 5 to write in the PSE, PPSE, and in the filtering rules.
The execution of Service 5 allows linking the PSE and the PPSE to a directory file, the content of which changes depending on the application that was explicitly selected by the Cardholder in Service 5, e.g., MasterCard® selected against the Maestro® on the contact card. Then the directory file is re-written by the interception application to list one single entry corresponding to the Application Identifier (AID).

Filtering rules represent the parameterization required for the engine's function of selection commands filtering as well as external flow sniffing and capturing. We list below as examples, some of the rules that it could be implemented:
Rule 1: Sniff and capture any PUT DATA commands with dedicated tags for the External Info Buffer. This allows backwards compatibility to be provided for the display balance function of an account in the bank.
Rule 2: On the external services interface-contact allow partial name selection only for the AID (short) corresponding to the application selected by the Cardholder in Service 5.

The mechanism of filtering during the selection process is useful for the situation when, for example, EMV 4.2 terminals do not implement indirect selection based on PSE, which is optional. In such a situation, the mechanism may work as follows:
1) The terminal sends SELECT AID (short) with the Registered Identifier, RID, corresponding to the MasterCard range of products.
2) The interception application searches the AID (long) corresponding to the application explicitly selected by the Cardholder in Service 5 and it answers the terminal the same FCI as the server implemented in the DCK 301 card for that AID (long) would have answered.
3) The terminal sends a new SELECT AID (short) "next occurrence" and the interception application answers an error code. The terminal compiles the candidate list to include only the AID (long) of the application selected by the Cardholder.
4) The terminal sends a final SELECT AID (long) corresponding to the unique application in the candidate list. The interception application allows the server with AID (long) to answer and to start the EMV transaction.

The interception application therefore allows the DCK 301 to advantageously provide complex services through logical control and switching without the DCK 301 hardware being changed.

MODIFICATIONS AND VARIATIONS

Embodiments of DCKs also comprise a number of modifications and variations from the DCKs described above.

In particular, the advantageous DCKs described herein are not limited to use in payment applications and can be used as passes or in other applications.

The DCK architecture has been described with separate Chip and micro-terminal units. An alternative implementation has a single chip providing the functions of both the Chip and micro-terminal. The chip communicates directly to the external and user interfaces in the same way as the above-described Chip and micro-terminal do. The chip would have its internal architecture based upon that of the Chip and micro-terminal. That is to say, the Chip and micro-terminal would be implemented by separate parts of the chip and be operated as if they were separate units.

In addition, or as an alternative, to having a keyboard in the user interface it is also possible to have a microphone on the DCK for implementing voice recognition or another biometric sensor (e.g., fingerprint, or finger vein). This is advantageous if the DCK has a small physical size and using a keyboard is difficult.

The descriptions herein should not be understood to prescribe a fixed order of steps or fixed way of providing a function. Rather, the functions may be performed in any way that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A card (301) for providing one or more services, the card (301) comprising:
   an external interface (302, 303) for communication with a terminal external from the card (301);
   a Chip (401) comprising one or more servers for storing one or more applications, wherein the Chip (401) is arranged to communicate with the external interface (302, 303);
   a user interface (304, 305, 306) for interacting with a user of the card (301);
   a re-configurable micro-terminal processor (402) for controlling the provision of one or more services, wherein the micro-terminal processor (402) is arranged to receive data from and transmit data to the user interface (304, 305, 306); and
   the Chip (401) and micro-terminal processor (402) are arranged to communicate with each other via an internal interface (403) of the Chip (401) and the Chip (401) is configured to send information to the micro-terminal processor (402) via the internal interface (403) in response to receiving one or more commands from the micro-terminal processor (402).

2. The card (301) of claim 1, wherein the external interface (302, 303) comprises:
   a contact interface (302) for communication with the external terminal over a non-wireless connection; and/or
   a contactless interface (303) for wireless communication with the external terminal.

3. The card (301) according to claim 1, wherein the user interface (304, 305, 306) comprises one or more of:
   a keyboard (304);
   a display (305); and
   LEDs (306).

4. The card (301) according to claim 1, wherein the Chip (401) is configured to send information to the external terminal via the external interface (302, 303) in response to receiving one or more commands from the external terminal.

5. The card (301) according to claim 1, wherein the one or more commands are Command Application Protocol Data Units, C-APDUs, and the information sent in response to receiving the one or more commands are Response Application Protocol Data Units, R-APDUs.

6. The card (301) according to claim 1, further comprising a battery arranged to provide the power supply of the Chip (401), the micro-terminal (402) and the user interface (304, 305, 306).

7. The card (301) according to claim 1, wherein the Chip (401) comprises a plurality of servers.

8. The card (301) according to claim 7, wherein the Chip (401) comprises an interception application for controlling the operation of the servers of the Chip (401) when providing the services of the micro-terminal processor (402).

9. The card (301) according to claim 8, wherein the interception application is arranged between the external interface (302, 303), the internal interface (403) and the servers of the Chip (401).

10. The card (301) according to claim 8, wherein the interception application comprises an engine arranged to control logical switching and filtering operations.

11. The card (301) according to claim 8, wherein:
    the Chip (401) has permanent electrical connections to the components of the external interface (302, 303); and
    the interception application is configured to logically switch on and off communication between the Chip (401) and the components of the external interface (302, 303) without physically changing the electrical connections to the components of the external interface (302, 303).

12. The card (301) according to claim 1, wherein the micro-terminal (402) is arranged to send one or more commands to the Chip (401) and to use the information received in one or more responses to provide one or more of the following services:
    display an account balance of the card (301);
    display a log of operations performed by the card (301);
    display a one time use password generated by the card (301); and
    verify, by the card (301), a PIN of a user that is input to the user interface (304, 305, 306) of the card (301).

13. The card (301) according to claim 1, wherein the micro-terminal processor (402) is arranged to provide a new service by performing logical operations only and without changing the electrical configuration of the card (301).

14. The card (301) according to claim 13, wherein the new service comprises disabling any of the components of the external or user interfaces of the card (301), such as disabling contactless communication with the card (301).

15. The card (301) according to claim 12, wherein the card (301) is arranged to provide a service in response to the user interface (304, 305, 306) receiving a selection of the service from a user.

16. The card according to claim 1, wherein the card is a payment card.

\* \* \* \* \*